US007077926B2

(12) United States Patent
Goffi et al.

(10) Patent No.: US 7,077,926 B2
(45) **Date of Patent: *Jul. 18, 2006**

(54) PROCESS FOR THE PRODUCTION OF VARIOUSLY PAINTED AND/OR DECORATED ARTEFACTS BY MEANS OF THE TECHNIQUE OF TRANSFER FROM A SUBLIMABLE COLOR SUPPORT

(75) Inventors: Italo Goffi, Tramigna (IT); Giancarlo Fenzi, Tramigna (IT)

(73) Assignee: V.I.V. International S.P.A., Cazzano di Trimigna (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,119

(22) Filed: Apr. 2, 1999

(65) Prior Publication Data

US 2001/0027839 A1 Oct. 11, 2001

(30) Foreign Application Priority Data

Apr. 15, 1998 (IT) ........................................ MI98A0780

(51) Int. Cl.

| | |
|---|---|
| ***B44C 1/17*** | (2006.01) |
| ***B44C 1/24*** | (2006.01) |
| ***B32B 31/20*** | (2006.01) |
| ***B30B 15/00*** | (2006.01) |
| ***B41C 1/06*** | (2006.01) |

(52) U.S. Cl. ...................... 156/230; 156/240; 156/247; 156/277; 156/289; 156/272.2; 156/285; 156/540; 156/583.1; 427/146; 427/148; 428/202; 428/207; 428/195; 101/34

(58) Field of Classification Search ................ 156/230, 156/238, 240, 241, 244.14, 244.16, 244.21, 156/244.23, 247, 277, 289, 285, 286, 381, 156/382, 384, 540, 542, 543, 552, 583.1, 156/583.2; 427/146, 147, 148; 428/195, 202, 428/204, 207, 914; 101/33, 34
See application file for complete search history.

(56) References Cited

U.S. PATENT DOCUMENTS

| | | | | | |
|---|---|---|---|---|---|
| 4,314,814 | A | * | 2/1982 | Deroode | 8/471 |
| 4,411,667 | A | * | 10/1983 | Meredith et al. | 8/471 |
| 4,923,847 | A | * | 5/1990 | Ito et al. | 503/227 |
| 5,308,426 | A | * | 5/1994 | Claveau | 156/234 |
| 5,641,372 | A | * | 6/1997 | Okuno | 156/230 |
| 5,893,964 | A | * | 4/1999 | Claveau | 156/382 |
| 6,136,126 | A | * | 10/2000 | Fenzi | 156/230 |

FOREIGN PATENT DOCUMENTS

EP 451067 A1 * 9/1991

(Continued)

OTHER PUBLICATIONS

U.S. Appl. No. 07/674,452, filed Mar. 25, 1991, Claveau.

*Primary Examiner*—Sue A. Purvis
(74) *Attorney, Agent, or Firm*—Collard & Roe

(57) ABSTRACT

Process for the production of variously decorated artefacts, comprising the steps of: preliminary preparation of the surfaces of the artefact, possible application of preliminary painting cycles or other surface treatments; covering or tight-wrapping up of the artefact with a transfer support bearing the decorations desired, realized from gas-tight thermoformable plastic material such as polyvinyl alcohol; creation of a vacuum between said transfer support and the artefact covered by the same, so that the support adheres to the shape of the artefact; and heating for the transfer of the decoration and the polymerization of the colors.

11 Claims, 1 Drawing Sheet

FOREIGN PATENT DOCUMENTS

| | | | | |
|---|---|---|---|---|
| EP | 0 451 067 | | | 10/1991 |
| EP | 0 544 603 | | | 6/1993 |
| EP | 0 606 189 | | | 7/1994 |
| EP | 606189 | A1 | * | 7/1994 |
| EP | 1138515 | A2 | * | 10/2001 |
| FR | 2 203 321 | | | 4/1974 |
| FR | 2203321 | | * | 10/1974 |
| FR | 2660252 | | | 10/1991 |
| WO | WO 96/22878 | | * | 8/1996 |
| WO | WO 96/29208 | | * | 9/1996 |
| WO | WO 99/04982 | | * | 2/1999 |

* cited by examiner

PROCESS FOR THE PRODUCTION OF VARIOUSLY PAINTED AND/OR DECORATED ARTEFACTS BY MEANS OF THE TECHNIQUE OF TRANSFER FROM A SUBLIMABLE COLOR SUPPORT

BACKGROUND OF THE INVENTION

1. Field of the Invention

The present invention relates to a process for the realisation of artefacts from various materials, such as metals, ceramics, wood, plastics or the like, of various sizes and/or variously decorated.

More particularly, said process allows to obtain various surface finishings such as wood grains and marble veins or other patterns, and to transfer on the piece and/or the surface of the artefact to be decorated any ornamental pattern, even a complicated one, without deformations or defects of said pattern.

2. The Prior Art

As is known, the present processes for the realisation of the decoration on metals involve realisation difficulties and complexities due to the fact that they require more or less automated systems which operate on the flat surface of strips or plates.

Processes and related apparatuses are known which allow to realise a polychrome and complex decoration on artefacts of various type and also having a non-flat surface, by means of the technique of the transfer of a pattern from a flexible support to the surface of said artefact by ink sublimation. As is known, such technique comprises the following steps: wrapping up the artefact with a support containing the sublimable decoration, usually from paper, fabric or the like; inserting the artefact wrapped up in the transfer support into a container made of two elastically deformable membranes fixed to two substantially rectangular frames hinged with each other; obtaining a vacuum in said container, so that the flexible membranes adhere to the artefact pressing the support against the surface of the artefact; and submitting then the whole to heating.

The pressure and the heat may be obtained by resistance heating, infrared rays or also an oil-bath oven. In this case, the piece to be decorated, suitably wrapped up by the decoration transfer support, is immersed in the oil-bath oven, protected by an envelope or bag from elastically-deformable, high-temperature-resistant material. Processes of this type and the related apparatuses are described, for instance, in FR 2203321 (VILLEROY), EP 544603 (CLAVEAU), EP 451067 (CLAVEAU), and EP 606189 (CLAVEAU).

However, the above processes have the drawback that the pressure exercised by the elastically deformable membranes is not always uniform on the whole surface of the support, and therefore irregularities can occur in the transfer of the decoration. Besides, it may happen that, during the creation of the vacuum, folds form in the support that wraps up the artefact, with ensuing defects in the transfer of the decoration and ensuing rejection of the decorated artefact obtained.

Besides, the transfer decoration processes according to the known art are rather complex and delicate as they require the use of the elastically deformable membranes which, besides, are liable to deteriorate and must be periodically repaired or replaced.

It is also known that all decorated artefacts must be suitably protected to prevent the deterioration from being damaged during the handling and transportation of the artefact or the installation or assembly of objects employing the decorated artefact; a system commonly used to protect the artefact consists in covering the same with a film from plastic material or the like, easily removable, which is removed once the decorated artefact has reached his destination or has been installed. This operation of protection of the artefact involves, consequently, additional costs that affect the overall cost of the artefact.

Object of this invention is to provide a process for the realisation of artefacts from various materials, such as steel, metal alloys, wood, plastics, ceramics, and the like, and also of big size, for instance, extruded artefacts with a length of up to 20 m, and rigid folded and shaped plates, so decorated as to reproduce exactly the aesthetic effect of various materials, such as wood, marble and the like, or anyhow provided on all the surface or part thereof with any ornamental pattern (floral, geometric or else), however complex and elaborated.

SUMMARY OF THE INVENTION

A further object is to provide various artefacts, variously decorated on the surfaces designed to remain on sight, also with complex patterns, that are substantially devoid of defects, irregularities in the pattern, and the like.

Another object of the invention is to provide a process of decoration by transfer comprising a reduced number of operating steps, particularly simple and highly reliable, that can lead to the realisation of finished and decorated artefacts suitable for many applications in many goods sectors, such as building, furniture, electric household appliances, domestic articles, and the like.

Still a further object of the invention is to provide a process of decoration of various artefacts allowing to obtain, through the same decoration process and without additional steps, an artefact whose surface is already protected by a covering film to be removed after the transportation and/or the installation of said artefact.

These and still other objects that will be more clearly stressed by the following description are achieved by a process for the realisation of various artefacts painted and/or variously decorated, from metals, ceramics, wood, plastics and the like, utilising the technique of the transfer of patterns or figures, monochromatic or polychromatic, reproduced on a transfer support by the combined action of pressure and temperature, which process, according to the present invention, comprises the following steps:

- submitting the raw artefact to be decorated to possible operations of preparation of the surfaces, such as cleaning, degreasing, chemical and/or electrolytic conversion, and possibly to one or more preliminary painting cycles, realisable with the use of liquid or powder paints, to avoid diffusion phenomena with the colors of the transfer support,
- performing the wrapping up or tight-covering of the artefact to be decorated, with a sublimable color transfer support, having the form of a sheet, strip, bag or envelope, comprising a supporting base from gas-tight thermoformable plastic material, the pattern or decoration to be transferred to the artefact to be decorated being carried on said support base,
- creating a vacuum between said artefact and said support, so as to cause the transfer support to uniformly adhere to the surface of the artefact to be decorated,
- submitting the so treated artefact to a heating action at temperatures on the order of 200–230° C., for a time of from about 30 seconds to 30 minutes, to perform the transfer and the polymerisation of the final colors from the transfer support to the artefact, removing, after the cooling and possibly after the handling and/or the installation of the decorated artefact, said exhausted supporting base from the decorated surface of the artefact.

More particularly, said supporting base from thermoformable, gas-tight plastic material is constituted by polyvinyl alcohol.

It has been found that the transfer support realised from polyvinyl alcohol according to the present invention, which is gas-tight and thermoformable and which has also an excellent resistance to traction, allows to obtain the vacuum directly between the artefact to be decorated and the support, and also to realise a perfect and uniform adhesion of the support to the artefact, eliminating in this way possible working rejects and greatly simplifying both the process and the installation, as well as the equipment necessary to realise it.

It has also been found that said exhausted supporting base, i.e. having no longer the pattern or decoration once this has been transferred on to the artefact surface, carries on the function of a protecting film of the decorated surface of the artefact and the same artefact, protecting it from blows, scratches and the like during the steps of storage and/or transportation, during the operations of installation, such as for instance, sawing in case of profiles for doors and windows, and the like, rendering in this way superfluous the application of the special protective films or paints, and allowing in this way a remarkable saving in both the protective material and the time employed to perform the application of said protecting material.

According to a variant of this invention, said artefact wrapped up or covered with said sublimable color transfer support which adheres by effect of the vacuum to the surface to be decorated, is submitted to a first intermediate heating action at a temperature at which the thermoforming occurs, i.e the permanent adhesion of the transfer support to the artefact support, even at a temperature lower to that at which the transfer and the polymerisation, and therefore the consolidation of the sublimable colors, occur.

DETAILED DESCRIPTION OF THE PREFERRED EMBODIMENT

Figure 1:
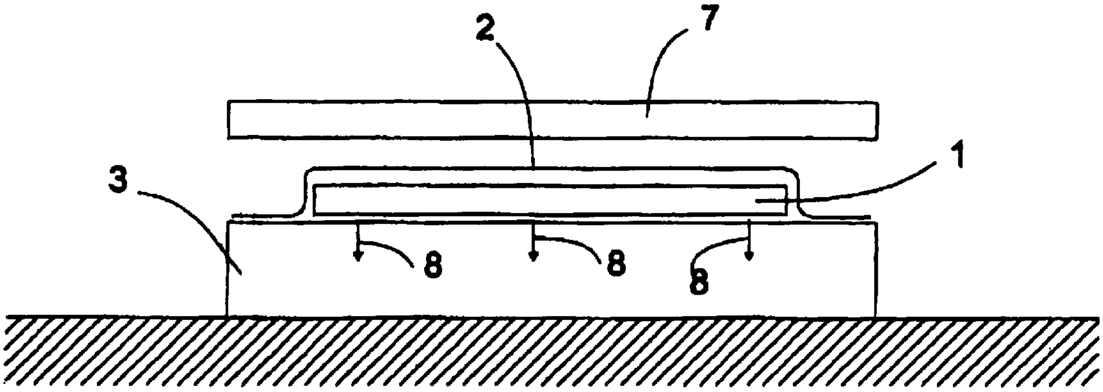
FIG. 1 shows a first embodiment of the present invention.
Figure 2:
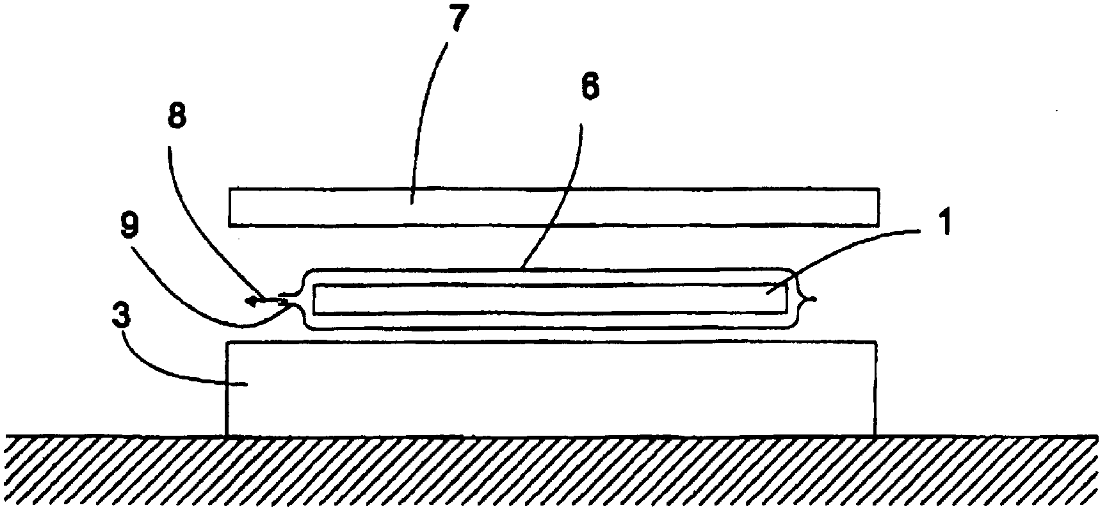
FIG. 2 shows a second embodiment of the invention.
Figure 3:
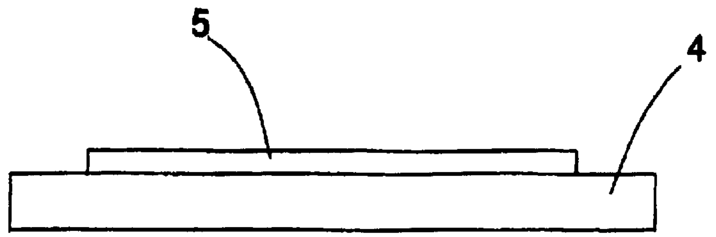
FIG. 3 shows a flexible support provided with a sublimable decoration.

Referring now in detail to the drawings and, in particular, FIG. 1 shows a process for painting and decorating artefacts 1, from metal materials, ceramic materials, wood, plastics, utilising the technique of the transfer of monochrome or polychrome patterns or figures reproduced on a transfer support 2, by means of the combined action of pressure and temperature.

The artefact is wrapped up or tightly covered with a sublimable colour transfer support 2, having the form of a sheet. The sheet is made of a supporting base 4 from gas-tight thermoformable plastic material, the pattern 5 or decoration to be transferred to artefact 1 being carried on support base 4.

A vacuum is created between artefact 1 and support 2, through a work bench 3 onto which said artefact 1 is placed. This causes transfer support 2 to uniformly adhere to the surface of the artefact 1 to be decorated.

Artefact 1 is submitted to a heating action at temperatures of 200–230° C., for a time of from about 30 seconds to 30 minutes, to perform the transfer and the polymerisation of the final colours from the transfer support 2 to the artefact 1.

Exhausted supporting base 4 is removed, after cooling, from the decorated surface of artefact 1.

According to a second aspect of the invention, a process for painting and decorating artefacts 1, from metal materials, ceramic materials, wood, plastics, utilising the technique of the transfer of monochrome or polychrome patterns or figures reproduced on a transfer support 2, by means of the combined action of pressure and temperature.

Artefact 1 is wrapped up or tightly covered with a sublimable colour transfer support 6, having the form of a bag, or a stocking, or an envelope, comprising a supporting base 4 from gas-tight thermoformable plastic material, the pattern 5 or decoration to be transferred to the artefact 1 to be decorated being carried on said supporting base 4.

A vacuum is created between artefact 1 and support 6, through an open end 9 of support 6, so as to cause the transfer support 6 to uniformly adhere to the surface of the artefact 1 to be decorated.

Artefact 1 is submitted to a heating action at temperatures of 200–230° C., for a time of from about 30 seconds to 30 minutes, to perform the transfer and the polymerisation of the final colours from the transfer support 6 to the artefact 1.

Exhausted supporting base 4 is removed, after cooling from the decorated surface of artefact 1. Supporting base 4 comprises thermoformable, gas-tight plastic material is constituted by polyvinyl alcohol.

Transfer support 2, 6 comprised of polyvinyl alcohol and is gas-tight and thermoformable, has excellent resistance to traction and forms the vacuum directly between the artefact and the support. This obtains a perfect and uniform adhesion of support 2, 6 to artefact 1, and eliminates possible working rejects and greatly simplifies both the process and the installation, as well as the equipment necessary to realise it.

Exhausted supporting base 4, i.e. having no longer the pattern or decoration once this has been transferred on to the artefact 1 surface, carries on the function of a protecting film of the decorated surface of the artefact 1 and the same artefact 1, protecting it from blows, scratches and the like during the steps of storage and/or transportation, during the operations of installation, such as sawing in case of profiles for doors and windows, and the like. Therefore, special protective films or paints are not needed. Providing a remarkable saving in both the protective material and the time employed to perform the application of said protecting material.

According to another embodiment, artefact 1 is wrapped up or covered with sublimable colour transfer support 2, 6 which adheres by a vacuum to the surface. It is submitted to a first intermediate heating action at a temperature at which the thermoforming occurs, i.e. the permanent adhesion of the transfer support 2, 6 to artefact 1 support, even at a temperature lower to that at which the transfer and the polymerisation, and therefore the consolidation of the sublimable colours, occur.

This operation, carried out for instance at a temperature of from 100° C. to 150° C. for a period of some minutes, allows for instance to rationalise the working cycle, by effecting an intermediate storing of the artefacts covered with the support, even though they are not finished, and to complete the cycle, according to the requirements, the demand of the market or the like.

Always according to the present invention, in order to ensure the adhesion of the inked support to the artefact to be decorated and/or to prevent deformations in the open profile artefacts, counter-templates or pads are applied in the cavities or recesses of the artefact to be decorated.

The counter-template is utilised in order to contrast the stresses ensuing from the creation of the vacuum, avoiding in this way deformations in the pieces to be decorated. The counter-template or pad may be obtained from any rigid or semi-rigid material resistant to work temperatures. Advantageously, materials such as silicone rubber, wood, aluminium, steel, etc., may be used.

More particularly, said final heating action is carried out by means of a set of infrared ray lamps, or said heating is carried out in the inside of a tunnel-oven or the like, with hot air circulation, produced by any energy source.

The final heating temperature is preferably maintained for a time of from 30 seconds to 30 minutes, having care to keep it under the decomposition temperature of polyvinyl alcohol or other thermoformable material.

The process object of the invention utilises for the applications on the section inks suitable even for outdoor exposure.

After the suitable and known operations of preparation of the surfaces to be decorated, there may be performed, as already said, one or more preliminary painting cycles, obtainable with either liquid or powder paints, having the purpose of obtaining the background color, and a possible transparent layer to prevent phenomena of diffusion with the transfer colors from the support (transfer). Besides, for the practical realisation of the process according to the present invention, various apparatuses may be utilised that allow to decorate artefacts of any shape and size, such as household articles, bricks, cans, vases and even open or closed section profiles of a length of up to about 20 meters, as well as folded and shaped plates having a size suitable to constitute parts of pieces of furniture, electric household appliances, such as refrigerator doors and the like.

An apparatus suitable to realise variously decorated artefacts according to the present invention comprises:

A work bench 3 whereon an artefact 1 to be decorated, possibly suitably pre-treated (cleaned, degreased and already treated with one or more preliminary layers of paint or submitted to colourless or coloured anodic oxidation) rests, and on which bench 3 said artefact is prepared by tight-closing it in the transfer support 2, 6.

A device 8 to create a vacuum between said transfer support 2, 6 and the artefact 1 to be decorated, so that said support 2, 6 adheres and exercises a pressure on said wrapped up artefact 1.

Heating means 7 located above said work bench 3, associated to ventilation and air circulation, positioned in a special hood.

Said transfer support may have the form of a sheet to be laid down on the surface to be decorated of the artefact placed on said work bench, through which a vacuum is obtained, or the form of a first sheet placed above the artefact and a second sheet placed under the artefact, shaped like a bag, a stocking or the like.

More particularly, said heating means may be advantageously constituted, for instance, by a battery of infrared ray lamps in a ventilated air room.

It has been found in the practice that the above described process allows to perfectly transfer the decorations present on the transfer support on all of the zones, event not flat, of the profile, which allows to perfectly decorate even profiles having a section complex and of any size.

Obviously, in the practical realisation, structurally and functionally equivalent modifications and variants may be made to the invention as described, illustrated and claimed, without departing from the protection scope of the invention.

Accordingly, while only one embodiment of the present invention has been shown and described, it is obvious that many changes and modifications may be made thereunto without departing from the spirit and scope of the invention.

What is claimed is:

1. A process for treating artefacts consisting essentially of the following steps in sequence:

providing an envelop formed from a transfer support consisting essentially of a single layer of material coated with a pattern, wherein said envelope is adapted to receive the artefact;

sucking air from an open end of said envelope to cause said transfer support to adhere to both sides of said artefact;

transferring said pattern from said transfer support to both sides of said artefact by heating said artefact and said transfer support and applying pressure to said pattern in contact with said artefact;

wherein said step of providing said envelope comprises forming said envelope from said transfer support so that said open end is defined by edge portions of said transfer support;

wherein during said sucking step, said envelope is so arranged as to retain flexibility along its periphery, thereby allowing said pressure to be applied to said pattern directly by said transfer support;

and wherein said envelop comprises an inner side contacting said object and an outer side contacting an external environment surrounding said envelope.

2. The process as in claim 1, wherein said transfer support comprises a first sheet placed above said artefact and a second sheet placed under said artefact.

3. The process according, to claim 1, further comprising the step of removing said transfer support from said artefact after handling and installing the artefact.

4. The process according to claim 1, wherein, after said sucking step, the process further comprises the step of submitting said artefact and said transfer support to a first intermediate heating action at a temperature at which said transfer support is thermoformed.

5. The process according to claim 1, wherein said heating step occurs at a temperatures comprised between 200° C. and 230° C.

6. The process according to claim 1, wherein said heating step lasts for a time between 30 seconds and 30 minutes.

7. The process according to claim 1, wherein said transfer support is made from a gas-tight thermoformable plastics material.

8. The process according to claim 7, wherein said gas tight thermoformable plastics material is constituted by polyvinyl alcohol.

9. A process for treating artefacts comprising the following steps in sequence:

providing an envelope formed from a gas-tight thermoformable transfer support which is adapted to receive the artefact;

sucking air from an open end of said envelope to cause said transfer support to adhere to both aides of said artefact;

transferring a pattern from said transfer support to both sides of said artefact by heating said artefact and said transfer support and applying pressure to said pattern in contact with said artefact;

wherein said step of providing said envelope comprises forming said envelope from said transfer support so that said open end is defined by edge portions of said transfer support;

wherein during said sucking step, said envelope is so arranged as to retain flexibility along its periphery, thereby allowing said pressure to be applied to said pattern directly by said transfer support;

and wherein during said sucking step, said envelope comprises an inner side contacting said object and an outer side contacting an external environment surrounding said envelope.

10. An apparatus for treating artefacts consisting essentially of:

enclosing means for enclosing an artefact into an envelope formed from a transfer support consisting essentially of a single layer of material coated with a pattern;

sucking means for sucking air from an open end of said envelope to cause said transfer support to adhere to said artefact;

heating means for heating said arteface and said transfer support to transfer said pattern from said transfer support to said artefact;

pressing means for applying pressure to said pattern in contact with said artefact to transfer said pattern onto said artefact;

wherein said enclosing means comprises forming means arrange for forming said envelope from said transfer support so that said open end is defined by edge portions of said transfer support;

wherein said pressing means comprises said transfer support which is provided with a flexible peripheral region arranged so as to allow said pressure to be directly applied by said transfer support to said pattern when air is sucked from said open end;

and wherein said envelope comprises an inner side contacting said object and an outer side contacting an external environment surrounding said envelope.

11. An apparatus for treating artefacts comprising:

enclosing means for enclosing an artefact into an envelope formed from a gas-tight thermoformable transfer support;

sucking means for sucking air from an open end of said envelope to cause said transfer support to adhere to said artefact;

heating means for heating said artefact and said transfer support to transfer a pattern from said transfer support to said artefact;

pressing means for applying pressure to said pattern in contact with said artefact to transfer said pattern onto said artefact;

wherein said enclosing means comprises forming means arranged for forming said envelope from said transfer support so that said open end is defined by edge portions of said transfer support;

and wherein said pressing means comprises said transfer support which is provided with a flexible peripheral region arranged so as to allow said pressure to be directly applied by said transfer support to said pattern when air is sucked from said open end.

and wherein said envelope comprises an inner contacting said object and an outer side contacting an external environment surrounding said envelope.

* * * * *

UNITED STATES PATENT AND TRADEMARK OFFICE

CERTIFICATE OF CORRECTION

PATENT NO. : 7,077,926 B2
APPLICATION NO. : 09/286119
DATED : July 18, 2006
INVENTOR(S) : Goffi et al.

It is certified that error appears in the above-identified patent and that said Letters Patent is hereby corrected as shown below:

In particular, in Column 6, line 16, (Line 3 of Claim 1), please change “envelop” to correctly read: --envelope--.
Column 6, line 35 (Line 22 of Claim 1), please change “envelop” to correctly read: --envelope--.
Column 6, line 50 (Line 2 of Claim 5), after the word “at” please delete: “a”.
Column 6, line 57 (Line 1 of Claim 8), please change “gas tight” to correctly read: --gas-tight--.
Column 6, line 66 (Line 7 of Claim 9), please change “aides” to correctly read: --sides--.
Column 7, line 25 (Line 9 of Claim 10), please change “arteface” to correctly read: --artifact--.
Column 7, line 32 (Line 16 of Claim 10), please change “arrange” to correctly read: --arranged--.
Column 8, line 26 (Line 18 of Claim 11), please delete the word: “and”.
Column 8, line 30 (Line 22 of Claim 11), after the word “end”, please delete “.” and insert: --;--.
Column 8, line 31 (Line 23 of Claim 11), after the word “inner” please insert the word --side--.

Signed and Sealed this

Second Day of January, 2007

JON W. DUDAS
*Director of the United States Patent and Trademark Office*